United States Patent [19]

Hamazaki et al.

[11] Patent Number: 5,027,753
[45] Date of Patent: Jul. 2, 1991

[54] INTAKE SYSTEM OF MULTI-CYLINDER INTERNAL COMBUSTION ENGINE

[75] Inventors: Minoru Hamazaki; Toshihiro Oikawa; Yoshifusa Kanazawa, all of Saitama, Japan

[73] Assignee: Honda Giken Kogyo Kabushiki Kaisha, Tokyo, Japan

[21] Appl. No.: 491,334

[22] Filed: Mar. 9, 1990

[30] Foreign Application Priority Data

Mar. 9, 1989 [JP] Japan ............... 1-57392

[51] Int. Cl.$^5$ ............................... F02M 35/10
[52] U.S. Cl. ................. 123/52 MB; 123/52 MV; 123/90.15
[58] Field of Search ........ 123/52 M, 52 MV, 52 ML, 123/52 MC, 52 MB, 52 MF, 90.18, 90.15

[56] References Cited

U.S. PATENT DOCUMENTS

| | | | |
|---|---|---|---|
| 2,980,089 | 4/1961 | Sampietro | 123/90.18 |
| 3,897,760 | 8/1975 | Hisserich | 123/90.18 |
| 4,182,289 | 1/1980 | Nakajima et al. | 123/90.18 |
| 4,352,344 | 10/1982 | Adyama et al. | 123/90.18 |
| 4,643,138 | 2/1987 | Ruf et al. | 123/52 MV |
| 4,669,428 | 6/1987 | Fchida et al. | 123/52 MV |
| 4,741,295 | 5/1988 | Hosaya et al. | 123/52 MV |
| 4,854,271 | 8/1989 | Miyano et al. | 123/52 MV |

FOREIGN PATENT DOCUMENTS

0073114 3/1989 Japan ............... 123/52 M

Primary Examiner—David A. Okonsky
Attorney, Agent, or Firm—Lyon & Lyon

[57] ABSTRACT

An intake system of a multi-cylinder interval combustion engine including a common inlet duct, first and second resonating ducts branched from the downstream end of the inlet duct, first and second resonating chambers leading from the first and second resonating ducts, respectively, a plurality of first intake ducts for connecting the first resonating chamber to a first group of cylinders, respectively, having ignition timings set not to come adjacent to each other, respectively, a plurality of second intake ducts for connecting the second resonating chamber to a second group of cylinders, respectively, having ignition timings set not to come adjacent to each other, a common intake chamber capable of communicating with both the resonating chambers through communication ports which can be closed by valves, and an actuator for opening and closing the valves at least in response to the engine revolutions. A valve operating system is provided to control at least the closure timing of the intake valves at least in response to the engine revolutions.

8 Claims, 12 Drawing Sheets

FIG.1A

Number: ignition order

INTAKE SYSTEM OF MULTI-CYLINDER INTERNAL COMBUSTION ENGINE

BACKGROUND OF THE INVENTION

1. Field of the Invention

The field of the present invention is an intake system of a multi-cylinder internal combustion engine which may contribute to enhancing the output performance of the engine by improving the charging efficiency of intake air to respective cylinders.

2. Description of the Prior Art

It has conventionally been known, for the purpose of improving the charging efficiency of intake air to respective cylinders, to connect a relatively long, first intake duct and a relatively short, second intake duct in parallel fashion to each of the cylinders and to feed the intake air to the cylinders through the first duct in a low speed operational range of the engine and through the second duct in a high speed operational range of the engine thereby raising the charging efficiency with use of an inertia effect over a wide range of engine operation (see Japanese Patent Application Laid-open No. 61-116022, for example).

A conventional intake system of the mentioned type suffers such a problem, however, that the construction of intake ducts is complicated and thereby makes the system large-sized.

SUMMARY OF THE INVENTION

The invention has been proposed in view of the above circumstances and an object thereof is to provide an intake system of a multi-cylinder internal combustion engine, which is capable of contributing to improvement in the output performance of the engine over a wide operational range in spite of its intake duct structure being designed simply.

In order to achieve the above object, according to the invention, there is proposed an intake system of a multi-cylinder internal combustion engine having first and second banks disposed in a V-shape and first and second groups of cylinders disposed in said first and second banks, respectively, each of the groups of cylinders having such an order of ignition that any one of the cylinders is not ignited immediately before or after ignition of the other cylinders of the same group, the system comprising, in a space defined between both the banks, a common inlet duct, first and second resonating ducts branched from a downstream end of the inlet duct, first and second resonating chambers leading to the first and second resonating ducts, respectively, a plurality of first intake ducts for connecting the first resonating chamber to said first group of cylinders, respectively, a plurality of second intake ducts for connecting the second resonating chamber to said second group of cylinders, respectively, a common intake chamber capable of communicating with both the first and second resonating chambers via a communication port, an opening and closing valve disposed in said communication port, and an actuator operable to drive said opening and closing valve for opening and closing operations at least in response to a number of revolution of the engine.

Further according to the invention, there is proposed an intake system of an internal combustion engine, comprising a common inlet duct, first and second resonating ducts branched from a downstream end of the inlet duct, first and second resonating chambers leading to the first and second resonating ducts, respectively, a plurality of first intake ducts for connecting the first resonating chamber to a first group of cylinders, respectively, of which cylinders the order of ignition is set such that any one of them is not ignited immediately before or after ignition of the other cylinders, a plurality of second intake ducts for connecting the second resonating chamber to a second group of cylinders, respectively, of which the order of ignition is set such that any one of the cylinders of the second group is not ignited immediately before or after ignition of the other cylinders of the second group, a common intake chamber capable of communicating with both the first and second resonating chambers via a communication port, an opening and closing valve disposed in said communication port, and an actuator operable to drive said opening and closing valve for opening and closing operations at least in response to a number of revolution of the engine, the intake system further comprising a valve operating system which is capable of controlling at least a timing of closure of an intake valve of each of said cylinders at least in response to the number of revolution of the engine.

With the above first-mentioned arrangement, if the opening and closing valve were closed in a low speed operational range of the engine, the cylinders on the respective banks are placed in communication with the common inlet duct via respective intake ducts, resonating chambers and resonating ducts. Therefore, when the number of engine revolution reaches a predetermined level corresponding to the natural frequency of the resonating chambers and ducts, the resonance effect may be produced thereby and the charging efficiency of intake air to the respective cylinders may be enhanced.

If the opening and closing valve were then opened in an intermediate or high speed operational range of the engine in this arrangement, both the resonance chambers are communicated with each other via the intake chamber, thus forming a surge tank of a large volume in cooperation. Accordingly, when the engine revolution reaches certain level corresponding to the length of each intake duct, the resonance chambers and resonance ducts lose their resonance function and in turn the inertia effect is obtained in this range and is utilized to enhance the charging efficiency of intake air to the cylinders.

Moreover, since only one kind of intake ducts of a relatively short length are required, the structure of the intake system is simplified and made compact, thereby permitting the system to be easily mounted in a narrow space between the banks. In consequence, the whole engine can also be made compact.

Due to the above second arrangement, the same merits as of the first arrangement are obtained, that is, the resonance effect and the inertia effect are advantageously utilized to raise the charging efficiency for each cylinder from a low speed range to an intermediate or high speed range. In addition, the closure timing of each intake valve is delayed in the intermediate or high speed operational range under the control of the valve operating system, whereby the effect of residual inertia of the intake air is achieved contributing to further enhancement of the charging efficiency.

In addition to the second arrangement, if it were arranged that the actuator is constructed such that it closes the opening and closing valve when the number of revolution of the engine is less than a first predetermined value whereas it opens the valve when the number of revolution exceeds the first predetermined value, and wherein the valve operating system is constructed such that it selects an earlier one of a plurality of closure timings of the intake valves when the number of revolution of the engine is less than a second predetermined value which is higher than the first predetermined value, and the valve operating system selects a later one of the plurality of closure timings of the intake valves when the number of engine revolution exceeds the second predetermined value, such further merits would then be obtained that the resonance effect, the inertia effect and the effect of residual inertia may be utilized sequentially in response to the low, intermediate and high speed operational ranges of the engine, thus permitting the charge of intake air to be enhanced over a wide operational range, enabling a high output operation at all times.

The above and other objects, features and advantages of the invention will become apparent from reading of the following detailed description of a preferred embodiment in conjunction with the accompanying drawings.

BRIEF DESCRIPTION OF THE DRAWINGS

The accompanying drawings show one embodiment according to the invention, wherein.

DESCRIPTION OF PREFERRED EMBODIMENT

One embodiment according to the invention will be described hereinafter in conjunction with the accompanying drawings.

Figure 1:
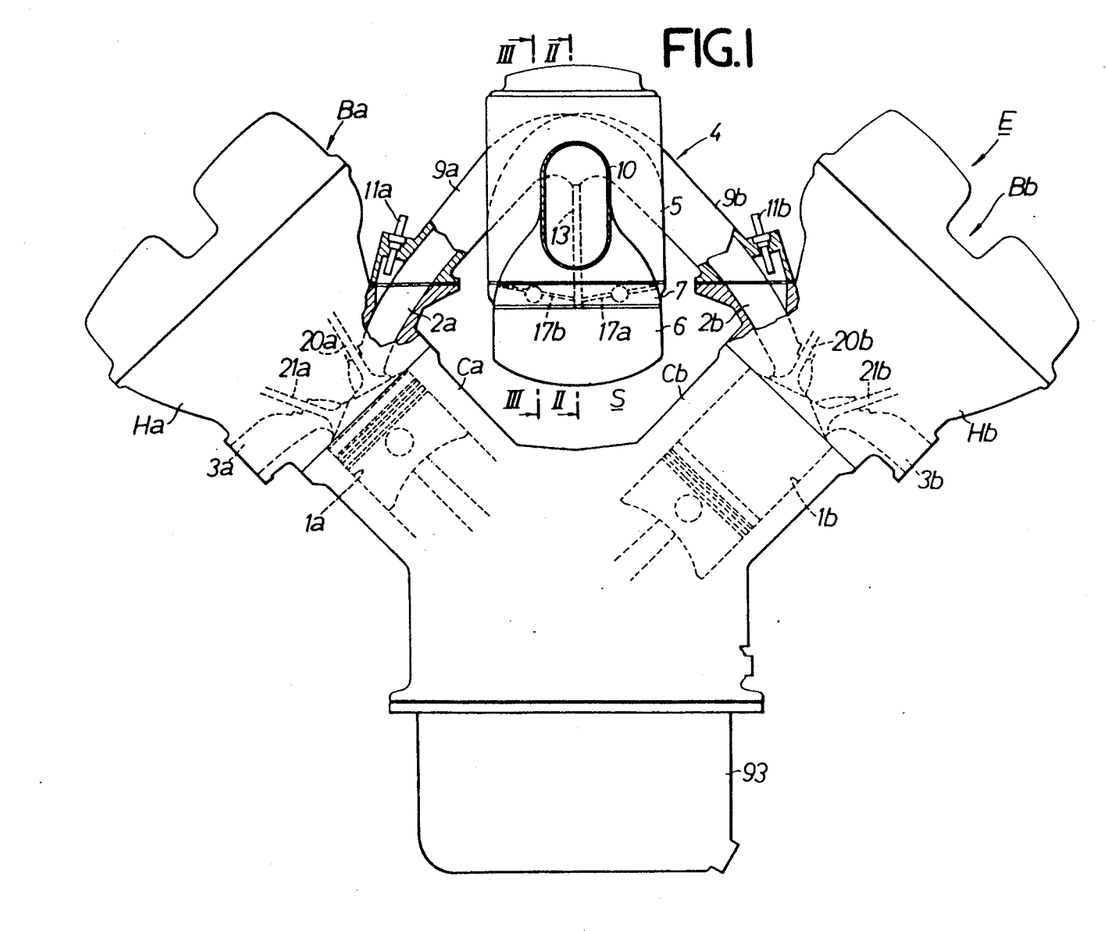
FIG. 1 is a side view of a V-shaped multi-cylinder internal combustion engine with a part thereof cut away.

First referring to FIG. 1, a V-type multi-cylinder internal combustion engine E is shown to have first and second banks Ba and Bb which are inclined relative to each other with an angle of 90° therebetween. These banks Ba and Bb are formed by joining cylinder heads Ha and Hb to upper surfaces of cylinder blocks Ca and Cb, respectively. The cylinder blocks Ca and Cb are integrally connected together at lower portions thereof.

Figure 1A:
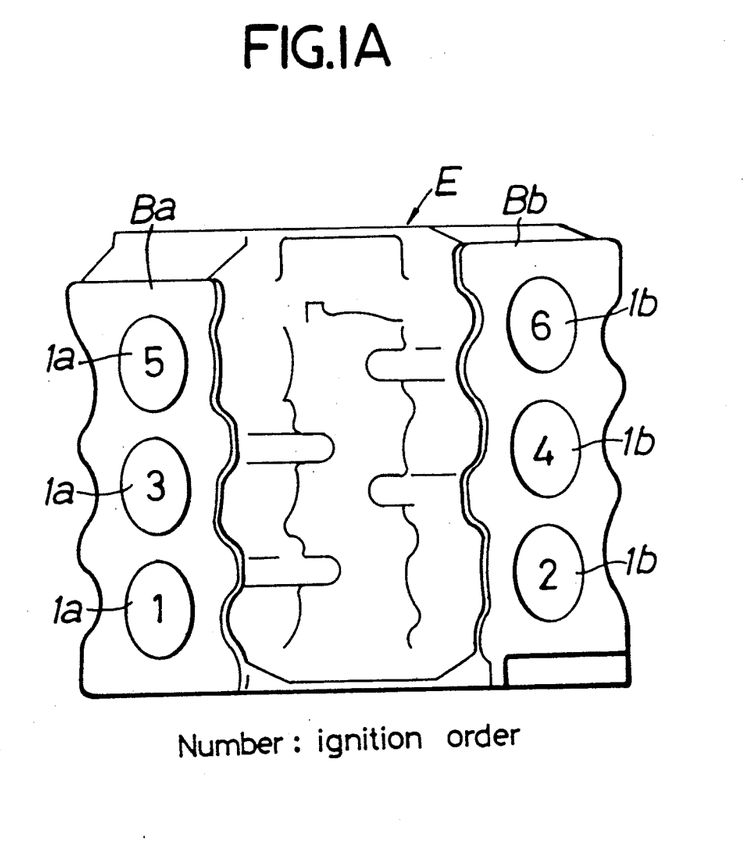
FIG. 1A is a plan view of cylinders of the engine with an indication of the ignition order on the cylinders.
Figure 2:
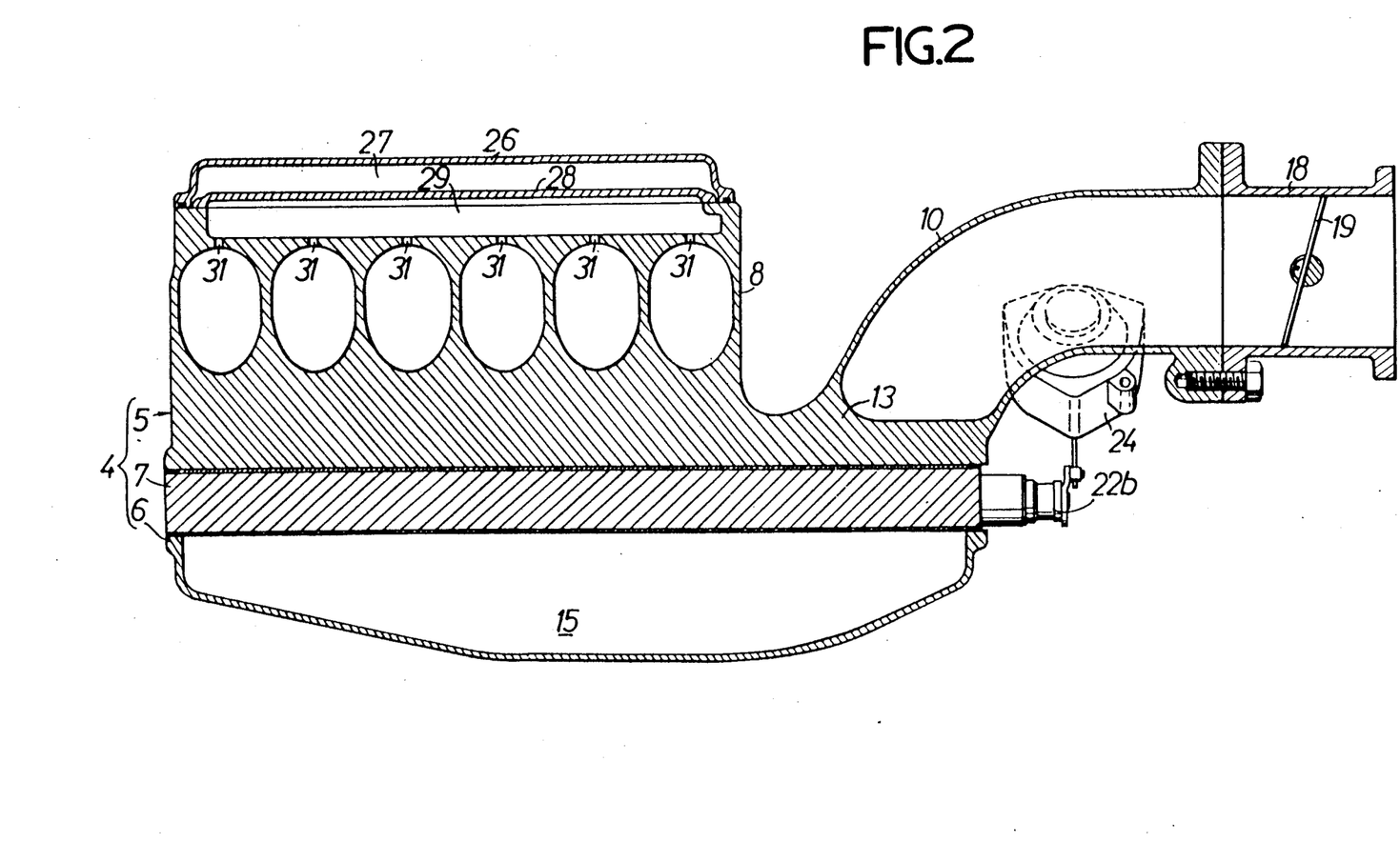
FIGS. 2 and 3 are enlarged sectional views taken along lines II—II and III—III of FIG. 1, respectively.
Figure 3:
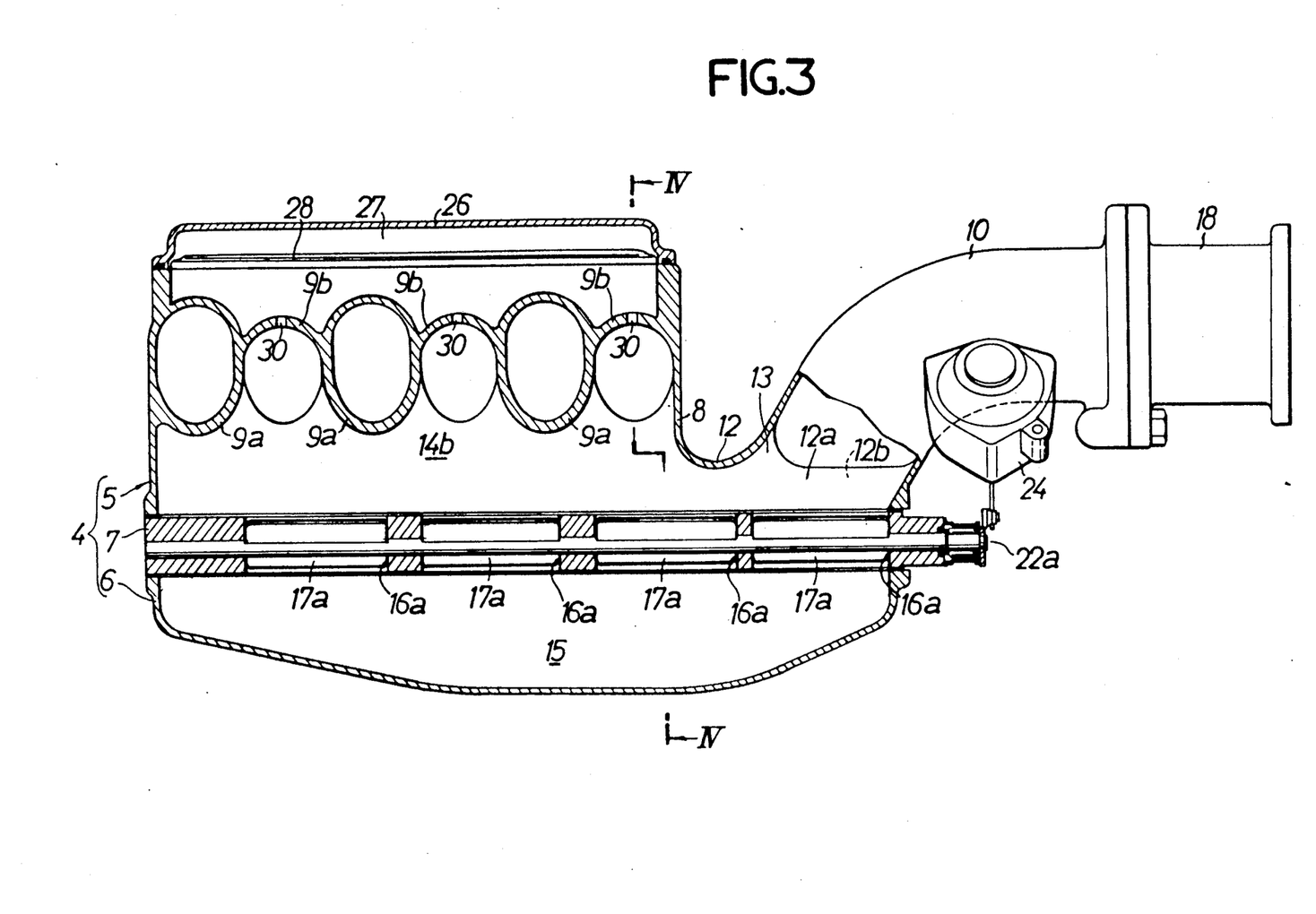
Figure 4:
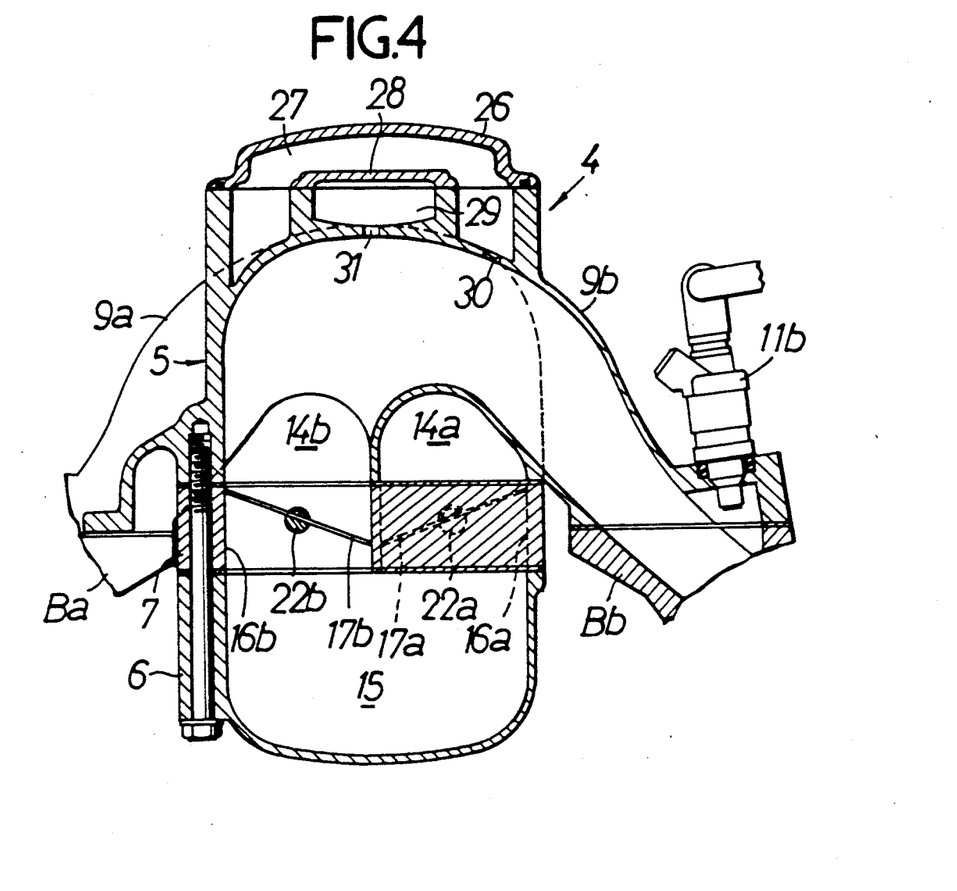
FIG. 4 is a sectional view taken along a line IV—IV of FIG. 3.

Each of the cylinder blocks Ca, Cb has three cylinders $1a$ . . . ; $1b$ . . . defined therein and the order of ignition of these three cylinders is set such that any one of the cylinders is not ignited immediately before or after ignition of the other two cylinders. One example of such order of ignition is shown in FIG. 1A.

A V-shaped space S is provided between both the banks Ba and Bb and there are opened intake ports $2a$ . . . and $2b$ . . . on one side surfaces of the banks facing that space S, which intake ports communicate with corresponding cylinders $1a$ . . . and $1b$ . . . and are opened upwards. On the opposite side surfaces of the banks Ba, Bb there are opened exhaust ports $3a$ . . . and $3b$ . . . which face downwards and communicate with corresponding cylinders $1a$ . . . and $1b$ . . . .

The cylinder heads Ha and Hb are further provided with intake valves $20a$ and $20b$ for opening and closing the respective intake ports $2a$ and $2b$ and exhaust valves $21a$ and $21b$ for opening and closing the respective exhaust ports $3a$ and $3b$.

An intake manifold 4 is disposed in the V-shaped space S.

Referring to FIGS. 1 to 4, the intake manifold 4 is constituted by joining an upper block 5 and a lower block 6 together via a partition member 7 interposed therebetween. The upper block 5 comprises a peripheral wall portion 8 of a rectangle-like cross section elongated as a tube in the direction of arrangement of the cylinders of the banks Ba, Bb, a plurality of (three in the illustrated embodiment) intake ducts $9a$ . . . which are bent substantially in a U-shape and connected to an upper part of the peripheral wall portion 8 at locations spaced in the longitudinal direction thereof while opening downwards for connection to the intake ports $2a$ . . . on one cylinder head Ha, a plurality of (three in the embodiment) intake ducts $9b$ . . . which are bent substantially in a U-shape and are connected to the upper part of the peripheral wall portion 8 at locations between the intake ducts $9a$ . . . while opening downwards so as to be connected to the respective intake ports $2b$ . . . on the other cylinder head Hb, and one inlet duct 10 connected to a lower part of the peripheral wall portion 8 at one longitudinal side thereof. These parts of the upper block 5 are integrally formed by molding. Outlets of the intake ducts $9a$ . . . , $9b$ . . . are opened downwards and are connected to the intake ports $2a$ . . . , $2b$ . . . of the cylinder heads Ha, Hb, respectively. Fuel injection nozzles $11a$ . . . , $11b$ . . . are mounted to the respective outlets of the intake ducts $9a$ . . . , $9b$ . . . for injecting fuel toward the associated intake ports $2a$ . . . , $2b$ . . . . The inlet duct 10 is formed continuous with the lower part of the peripheral wall portion 8 at its longitudinal one side via a neck portion 12 and is bent upwardly while extending along the arrangement of the cylinders away from the wall portion 8, and is finally connected to a throttle body 18. A throttle valve 19 is carried in the throttle body 18 so as to be rotatable around an axis for opening and closing an intake passage defined in the body 18.

The partition member 7 is formed basically to be flat and rectangle in order to close a lower opened end portion of the upper block 5 and a space defined between this partition member 7 and the upper block 5 is divided into a pair of resonance chambers $14a$ and $14b$ by means of a wall 13 which is formed integrally with the upper block 5 and extends longitudinally of the peripheral wall portion 8. The volumes of these resonance chambers $14a$ and $14b$ are set relatively small and one of the chambers $14a$ is communicated with one group of intake ducts $9a$ . . . while the other resonance chamber $14b$ is communicated with the other group of intake ducts 9b .... Both the resonance chambers 14a and 14b are further connected to the common inlet duct 10 through a pair of resonance ducts 12a and 12b, respectively, which are formed in the neck portion 12. In this embodiment, the wall 13 serves also as a partition wall separating the resonance ducts 12a and 12b.

The lower block 6 is formed into a box-like shape having an upper part thereof opened and the partition member 7 serves to close the upper opened part of the block 6 while defining an intake chamber 15 of relatively large volume between the block 6 and the member 7. In other words, the intake chamber 15 is disposed adjacently to and below the resonance chambers 14a, 14b with the partition member 7 interposed therebetween.

On the other hand, the partition member 7 is formed with four communication ports, 16a ... providing communication between one resonance chamber 14a and the intake chamber 15, and further with four communication ports 16b ... which provide communication between the other resonance chamber 14b and the intake chamber 15. One group of communication ports 16a ... are located so as to correspond to one resonance duct 12a and the intake ducts 9a ... whereas the other group of communication ports 16b ... are located so as to correspond to the other resonance duct 12b and intake ducts 9b .... Opening and closing valves 17a ... and 17b ... are disposed in respective communication ports 16a ... and 16b ... for opening and closing thereof. One group of opening and closing valves 17a ... are fixed to a common valve shaft 22a which is rotatably carried on the partition member 7 and the other group of opening and closing valves 17b ... are fixed to a common valve shaft 22b rotatably carried on the member 7. An actuator 24 is commonly connected to respective one ends of the valve shafts 22a and 22b.

The actuator 24 is constructed, for example, such that it is operated with boosting negative pressure introduced thereinto to rotate and drive the valve shafts 22a and 22b and thus causes the valves 17a ..., 17b ... to be opened and closed in response to the number of revolution of engine.

A first cover member 26 is joined to an upper part of the upper block 5 thereby defining an EGR gas chamber 27 between the cover member 26 and the upper block 5. A second cover member 28 is also joined to the upper part of the upper block 5 in a manner to be covered itself by the first cover member 26. A blow-by gas chamber 29 is defined between the second cover member 28 and the upper block 5. An EGR gas is introduced into the EGR gas chamber 27 through a supply duct, not shown, and the EGR gas thus introduced is then supplied into the respective intake ducts 9a ..., 9b ... via a plurality of supply ports 30... which are formed through the upper part of the upper block 5. A blow-by gas is introduced into the blow-by gas chamber 29 through a supply duct, not shown, and that gas is supplied into the intake ducts 9a ..., 9b ... via a plurality of supply ports 31... which are formed through the upper part of the upper block 5.

Figure 11:
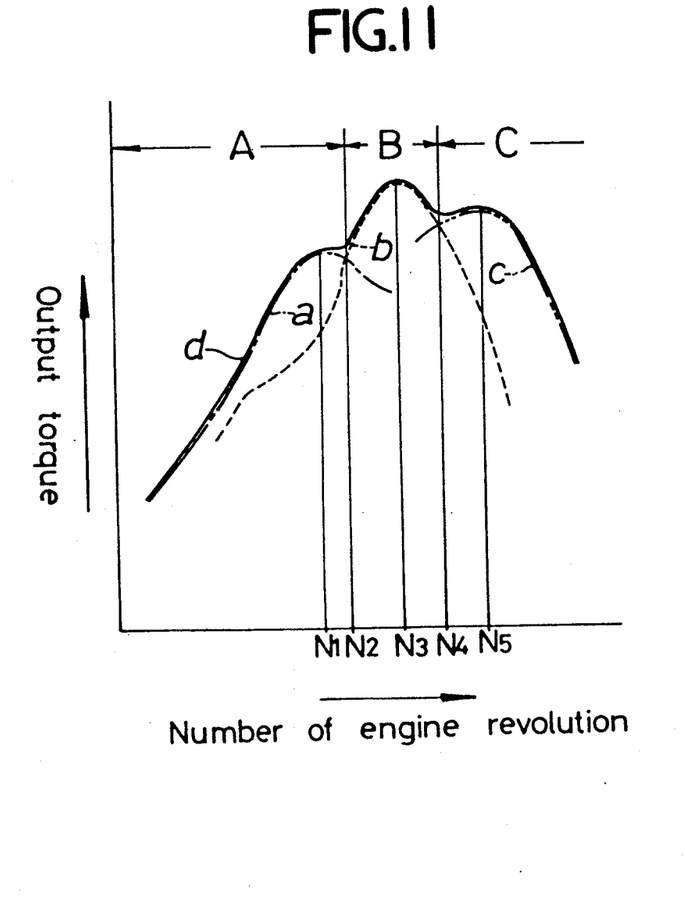
FIG. 11 is a diagrammatic view of an output characteristic of the engine.

In this embodiment, the volumes of the resonance chambers 14a, 14b and the lengths and cross-sectional areas of resonance ducts 12a, 12b are set so as to make the resonance effect obtained thereby maximum when the number of revolution of engine is at N1 in a low speed operational range A as shown in FIG. 11. Further, the lengths and cross-sectional areas of intake ducts 9a, 9b are set such that they maximize the intake inertia effect at a predetermined number of engine revolution, N3, in an intermediate speed operational range B. The actuator 24 operates to close all the opening and closing valves 17a, 17b in the low speed operational range A of the engine and to open all the valves 17a, 17b in the intermediate and high speed operational ranges B and C with the number of engine revolution N2 as a border therebetween.

Next referring to FIGS. 5 to 9, description will be made on a valve operating system for driving the aforementioned intake valves 20a, 20b and exhaust valves 21a, 21b to respective open and closed positions. Incidentally, the valve operating systems in this embodiment are formed symmetrical on the side of the first bank Ba and on the side of the second bank Bb, so that details of the valve operating system on the first bank Ba side only will be explained in the following.

Figure 5:
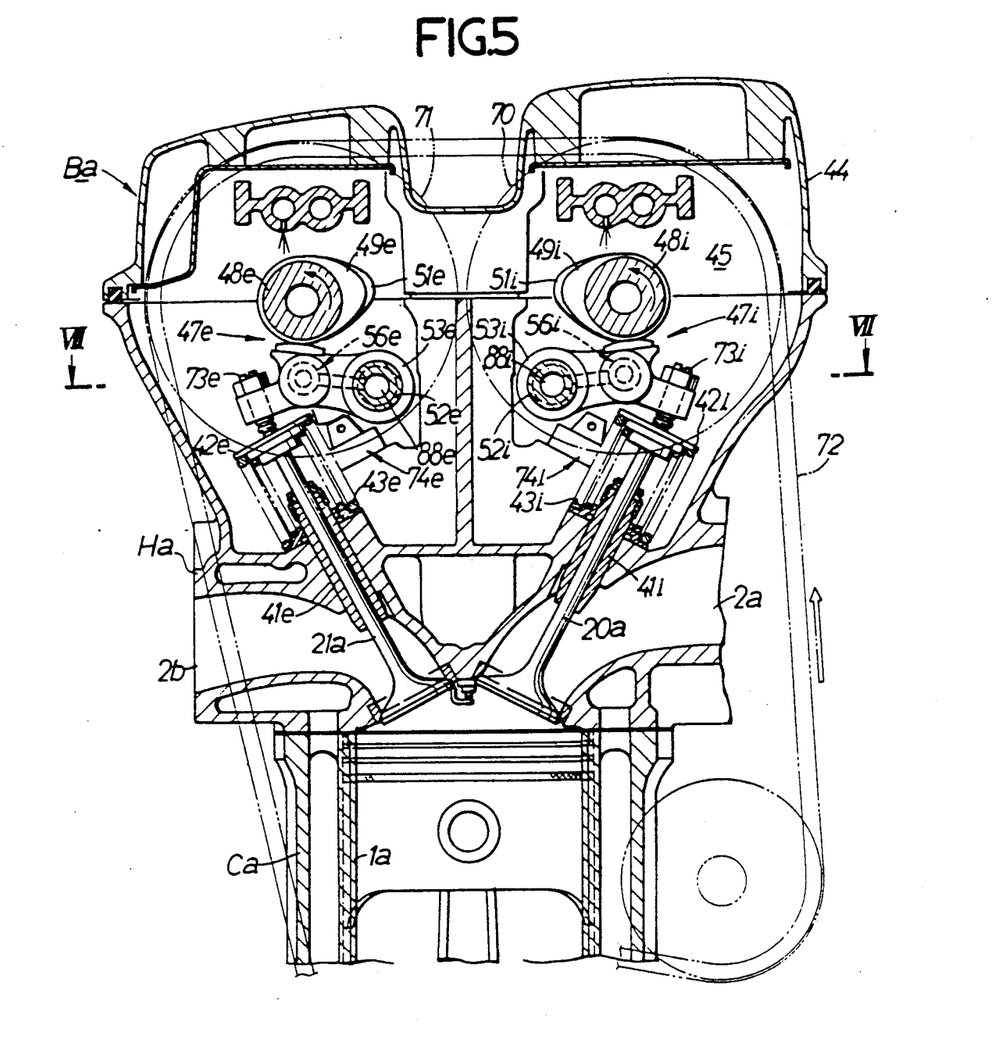
FIG. 5 is a longitudinal sectional view on an enlarged scale of a first bank of the engine of FIG. 1 (and a sectional view taken along a line V—V of FIG. 7)
Figure 6:
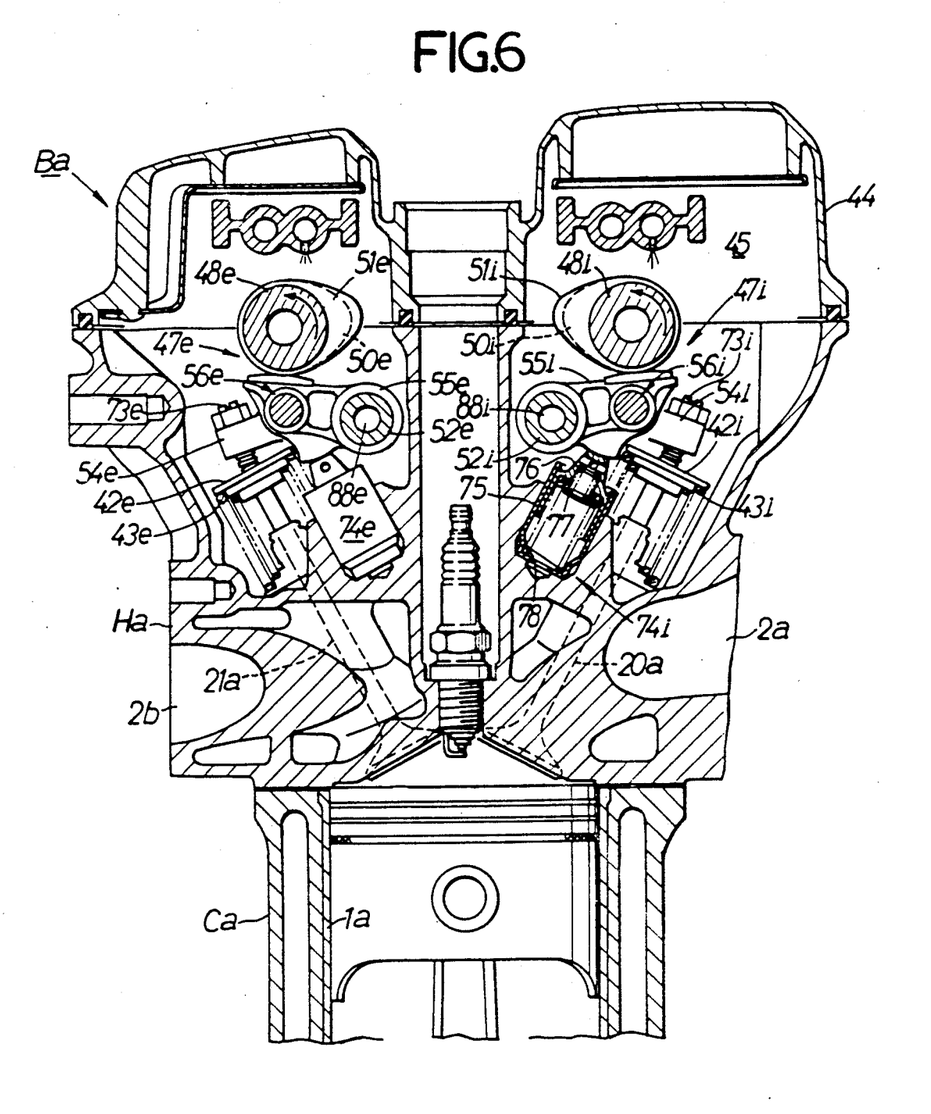
FIG. 6 is also a longitudinal sectional view of the first bank but at a different portion thereof (and a sectional view taken along a line VI—VI of FIG. 7)
Figure 7:
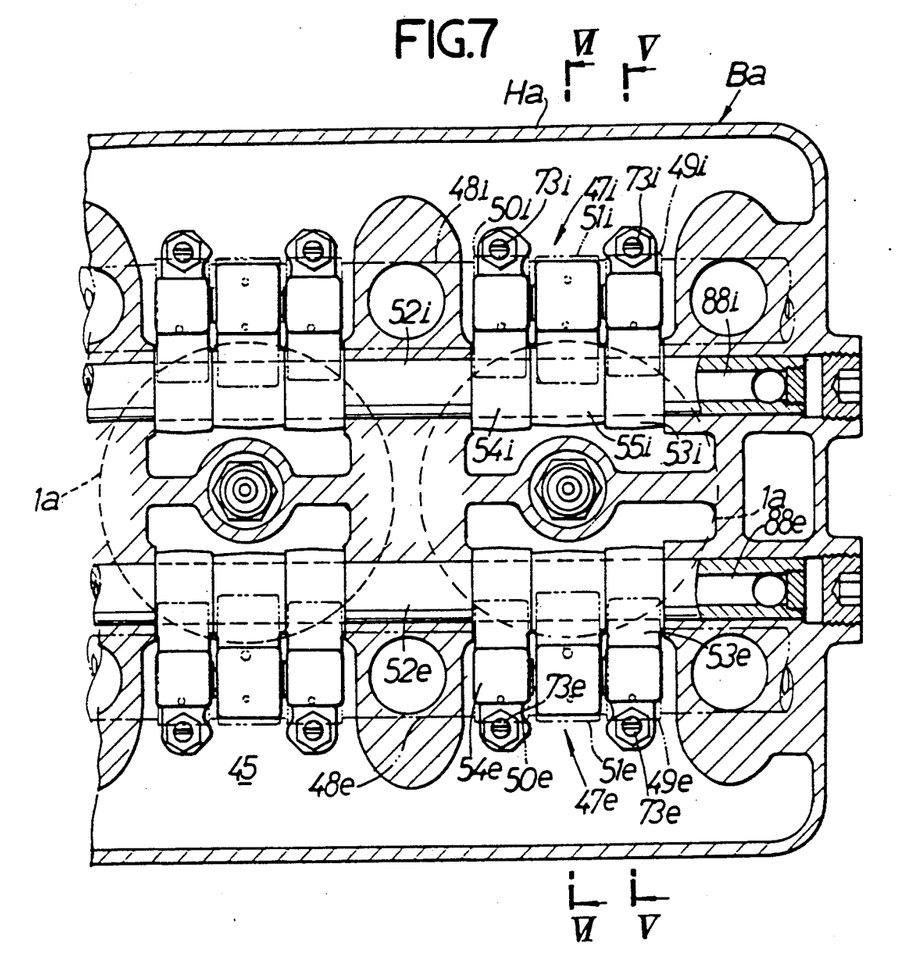
FIG. 7 is a sectional view taken along a line VII—VII of FIG. 5.

Reference will first be made to FIGS. 5 to 7 wherein it is shown that a pair of intake valves 20a, 20a and a pair of exhaust valves 21a, 21a are equipped for each cylinder 1a and guide sleeves 41i, 41e are fitted to the cylinder head Ha for guiding opening and closing movements of the intake and exhaust valves 20a, 21a. Stem ends of the intake valves 20a and exhaust valves 21a are projected upwardly from the guide sleeves 41i, 41e and valve springs 43i, 43e are mounted under compression between flange portions 42i, 42e disposed on the valve stem ends and the cylinder head Ha. The valve springs 43i, 43e serve to urge the associated intake valves 20a and exhaust valves 21a upwardly, i.e., in the valve-closing direction.

A head cover 44 is joined to the upper end of the cylinder head Ha to define therebetween an operation chamber 45 which is used to accommodate therein an intake valve side valve operating system 47i for drivingly opening and closing the intake valves 20a of each cylinder 1a and an exhaust valve side valve operating system 47e for drivingly opening and closing the exhaust valves 21a of each cylinder 1a. Both the valve operating systems 47i and 47e basically have the same structure as each other so that the intake valve side valve operating system 47i will be described below with affix "i" being attached to reference numerals for the elements thereof and the exhaust valve side valve operating system 47e will be illustrated only with affix "e" attached to reference numerals for its associated elements and description of the latter will be omitted here.

The intake valve side valve operating system 47i comprises a camshaft 48i which is driven for rotation at a reduction ratio of ½ from a crankshaft, not shown, of the engine; a rocker shaft 52i fixed to the cylinder head Ha in parallel to the camshaft 48i; a first drive rocker arm 53i, a second drive rocker arm 54i and a free rocker arm 55i which are pivotable around the rocker shaft 52i and disposed in correspondence to each cylinder 1a; and a hydraulically operated connection changeover mechanism 56i disposed over the rocker arms 53i, 54i and 55i for each cylinder 1a.

One ends of both the camshafts 48i and 48e are projected outside of the cylinder head Ha and are fixed thereon with timing pulleys 70 and 71 around which a timing belt 72 is wrapped for transmitting a driving force to the pulleys from the crankshaft, not shown. This arrangement makes the camshafts 48i and 48e rotate in the same direction.

The camshaft 48i is integrally formed with low speed cams 49i and 50i at positions corresponding to the respective intake valves 20a, 20a of each cylinder 1a and also with a high speed cam 51i between both the low speed cams 49i and 50i. On the other hand, the rocker shaft 52i is disposed below the camshaft 48i. On this rocker shaft 52i are pivoted a first drive rocker arm 53i operatively connected to one intake valve 20a, a second drive rocker arm 54i operatively connected to the other intake valve 20a and a free rocker arm 55i disposed between the first and second drive rocker arms 53i and 54i, these rocker arms being disposed adjacent to each other.

A tappet screw 73i is threadedly engaged in each of the first and second drive rocker arms 53i and 54i for advanced and retracted movements relative thereto and these tappet screws 73i are placed in abutment against the stem ends of the corresponding intake valves 20a, thus bringing the drive rocker arms 53i, 54i in operative connection with the intake valves 20a, respectively.

The free rocker arm 55i is resiliently urged by a lost motion mechanism 74i interposed between the arm 55i and the cylinder head Ha in a direction coming into slide contact with the high speed cam 51i. The lost motion mechanism 74i comprises a bottomed, cylindrical guide member 75 fitted at its closed end to the cylinder head Ha, a piston 76 slidably fitted into the guide member 75 and abutting against a lower surface of the free rocker arm 55i, and first and second springs 77 and 78 interposed in series between the piston 76 and the guide member 75 to urge the piston 76 toward the free rocker arm 55i. The spring constants of first and second springs 77 and 78 are set differently from each other.

Figure 8:
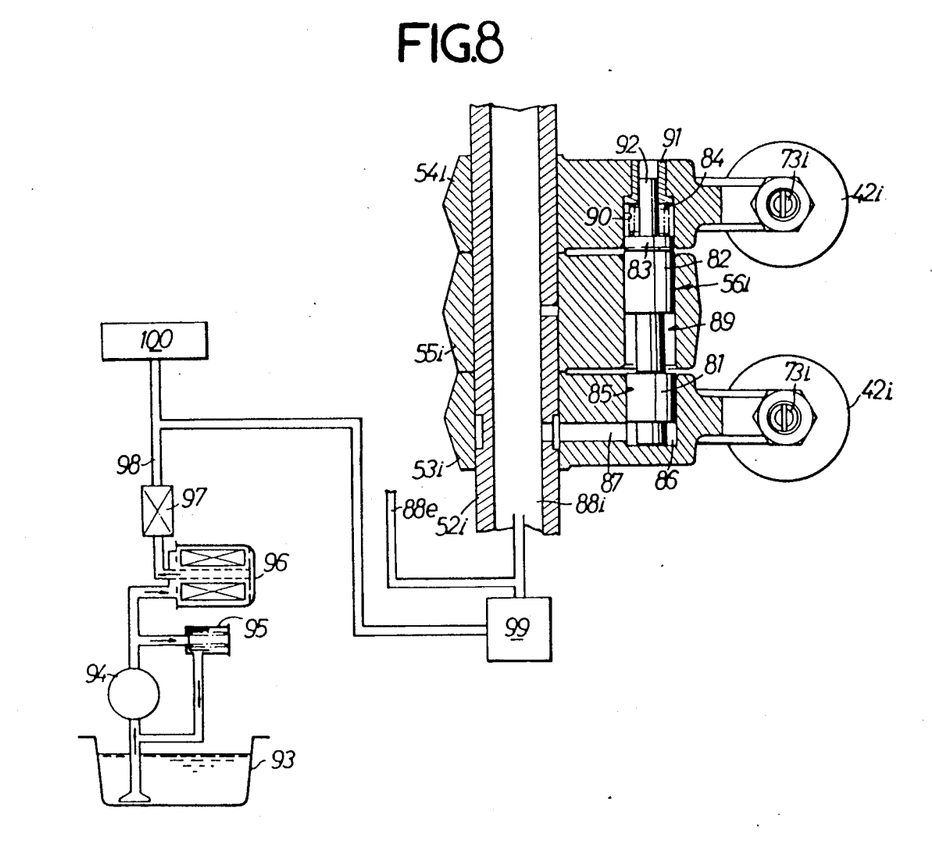
FIG. 8 is a transverse sectional view of a connection changeover mechanism.

In FIG. 8, the hydraulically operated connection changeover mechanism 56i comprises a first changeover pin 81 capable of connecting the first drive rocker arm 53i and the free rocker arm 55i, a second changeover pin 82 capable of connecting the free rocker arm 55i and the second drive rocker arm 54i, a regulating pin 83 for regulating shifting movements of the first and second changeover pins 81 and 82, and a return spring 84 which urges the pins 81, 82 and 83 toward the side releasing the connection between the rocker arms.

The first drive rocker arm 53i is formed with a bottomed, first guide bore 85 which opens toward the free rocker arm 55i and extends parallel to the rocker shaft 52i. The first changeover pin 81 is slidably fitted into the first guide bore 85 to define a hydraulic pressure chamber 86 between one end of the first changeover pin 81 and the closed end of the first guide bore 85. The first drive rocker arm 53i is further bored with a passage 87 communicating with the hydraulic pressure chamber 86 and the rocker shaft 52i is formed therein with an oil supply passage 88i which is always in communication with the hydraulic pressure chamber 86 via the passage 87 irrespective of the swung position of the first drive rocker arm 53i.

The free rocker arm 55i is formed with a guide hole 89 extending in alignment with the first guide bore 85 and in parallel to the rocker shaft 52i over opposite side surfaces of the free rocker arm 55i. The second changeover pin 82 is slidably fitted in the guide hole 89 while having one end thereof abutted against the other end of the first changeover pin 81.

The second drive rocker arm 54i is formed with a bottomed, second guide bore 90 which extends in alignment with the guide hole 89 and in parallel to the rocker shaft 52i and opens toward the free rocker arm 55i. The regulating pin 83 of a disc shape is slidably fitted in this second guide bore 90 while abutting against the other end of the second changeover pin 82. A guide sleeve 91 is fitted to the closed end of the second guide bore 90 and a shaft portion 92 projected integrally and coaxially from the regulating pin 83 is slidably fitted in this guide sleeve 91. The return spring 84 is interposed under compression between the guide sleeve 91 and the regulating pin 83 and its spring force acts on the mutually abutted pins 81, 82 and 83 to urge them toward the hydraulic pressure chamber 86.

An oil pan 93 is disposed at a bottom portion of the engine and an oil pump 94 is operable to pump up oil from the oil pan 93. The oil pump 94 is connected at its delivery port to an oil gallery 98 via a relief valve 95, an oil filter 96 and an oil cooler 97 and the oil gallery 98 is in turn connected to the oil supply passage 88i of the afore-mentioned connection changeover mechanism 56i via a changeover valve 99 and further to lubricated parts 100 in the engine.

The changeover valve 99 is operated such that when the number of revolution of the engine stays in the low or intermediate speed operational range A or B, that is, when it is less than the value N4, the valve is closed to let the oil supply passage 88i be released to a lower pressure part, whereas when the number enters the high speed operational range C or exceeds the value N4, the valve opens to place the oil gallery 98 in communication with the oil supply passage 88i.

Figure 9:
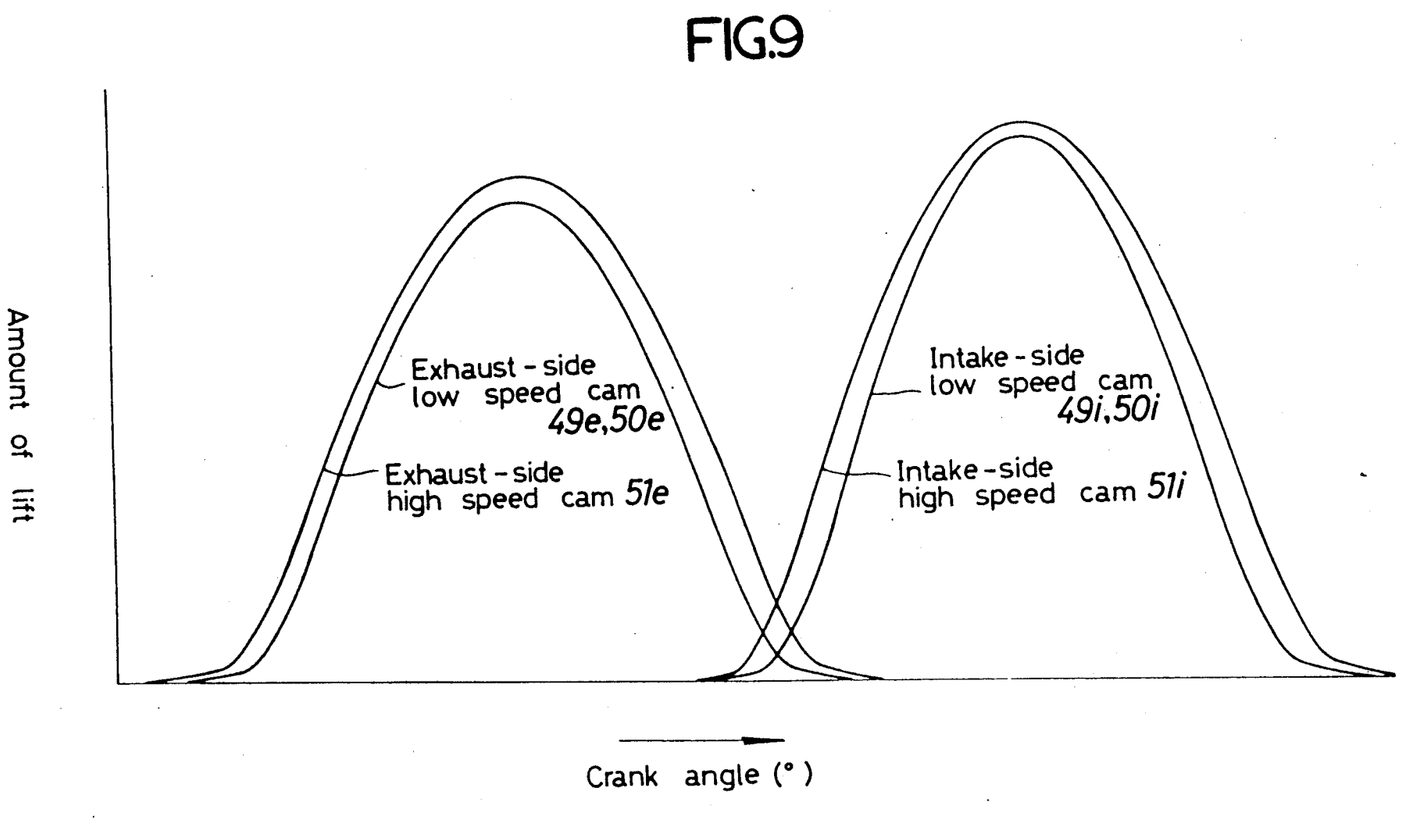
FIG. 9 is a chart of developed profiles of intake and exhaust cams.

FIG. 9 shows profiles of operation of the intake-side and exhaust-side cams 49i, 50i, 51i; 49e, 50e, 51e for driving the intake and exhaust valves 20a and 21a of each cylinder 2a. As will be apparent from FIG. 9, the pair of low speed cams 49i, 50i; 49e, 50e are identical to each other in the configuration and the high speed cam 51i; 51e is formed to have a higher lobe or crest portion, namely a greater amount of lift, than the associated low speed cams and the feet on opposite sides of the lobe are distanced from each other greater than the low speed cams. With this arrangement, when the high speed cam 51i; 51e is operated, the angle of overlapping between the intake valve 20a and the exhaust valve 21a becomes larger than the case where the low speed cams 49i, 50i; 49e, 50e are operated and this results in a delay in the timing of closure of the intake valve 20a.

The operation of this embodiment will next be described. In the low speed operational range A of the engine, the actuator 24 operates to close the opening and closing valves 17a . . . , 17b . . . . Then, the intake ducts 9a . . . leading to the respective intake ports 2a on the first bank Ba are communicated with the inlet duct 10 via one resonance chamber 14a and resonance duct 12a, whereas the intake ducts 9b . . . leading to the respective intake ports 2b on the second bank Bb are communicated with the inlet duct 10 via the other resonance chamber 14b and resonance duct 12b. Accordingly, the intake air which has been adjusted its amount of flow while passing the intake passage in the throttle body 18 by means of the throttle valve 19 enters the inlet duct 10 and is then divided as two flows into the resonance chambers 14a, 14b, respectively. Each of the flows is further divided as sub flows into the three intake ducts 9a . . . , 9b . . . , respectively, thereafter passing through the corresponding intake ports 2a . . . , 2b . . . to be sucked into the respective cylinders 1a . . . , 1b . . . . During this operation, fuel is also injected from the fuel injection nozzles 11a, 11b and is supplied, along with the intake air, into the cylinders 1a, 1b.

In this operation, in the intake-side valve operating system 47i, the changeover valve 99 assumes a position at which the oil supply passage 88i is released to the lower pressure part since the number of engine revolution is less than the value N4, whereby the pressure in the hydraulic pressure chamber 86 is held at a low level and the spring force of the return spring 84 works and brings the mutually abutting faces of the first changeover pin 81 and the second changeover pin 82 to a return position between the first drive rocker arm 53$i$ and the free rocker arm 55$i$ and also the mutually abutting faces of the second changeover pin 82 and the regulating pin 83 to a return position between the free rocker arm 55$i$ and the second drive rocker arm 54$i$. Thus, the mutual connection between the rocker arms 53$i$, 55$i$ and 54$i$ is released.

If the camshaft 48$i$ were rotated in this state, the first and second drive rocker arms 53$i$ and 54$i$ are swung by the low speed cams 49$i$ and 50$i$, thereby in cooperation with the valve springs 43$i$ and 43$i$ opening and closing the intake valves 20$a$ and 20$a$.

The similar operation is carried out also in the exhaust-side valve operating system 47$e$ to open and close the exhaust valves 21$a$ and 21$a$.

Figure 10:
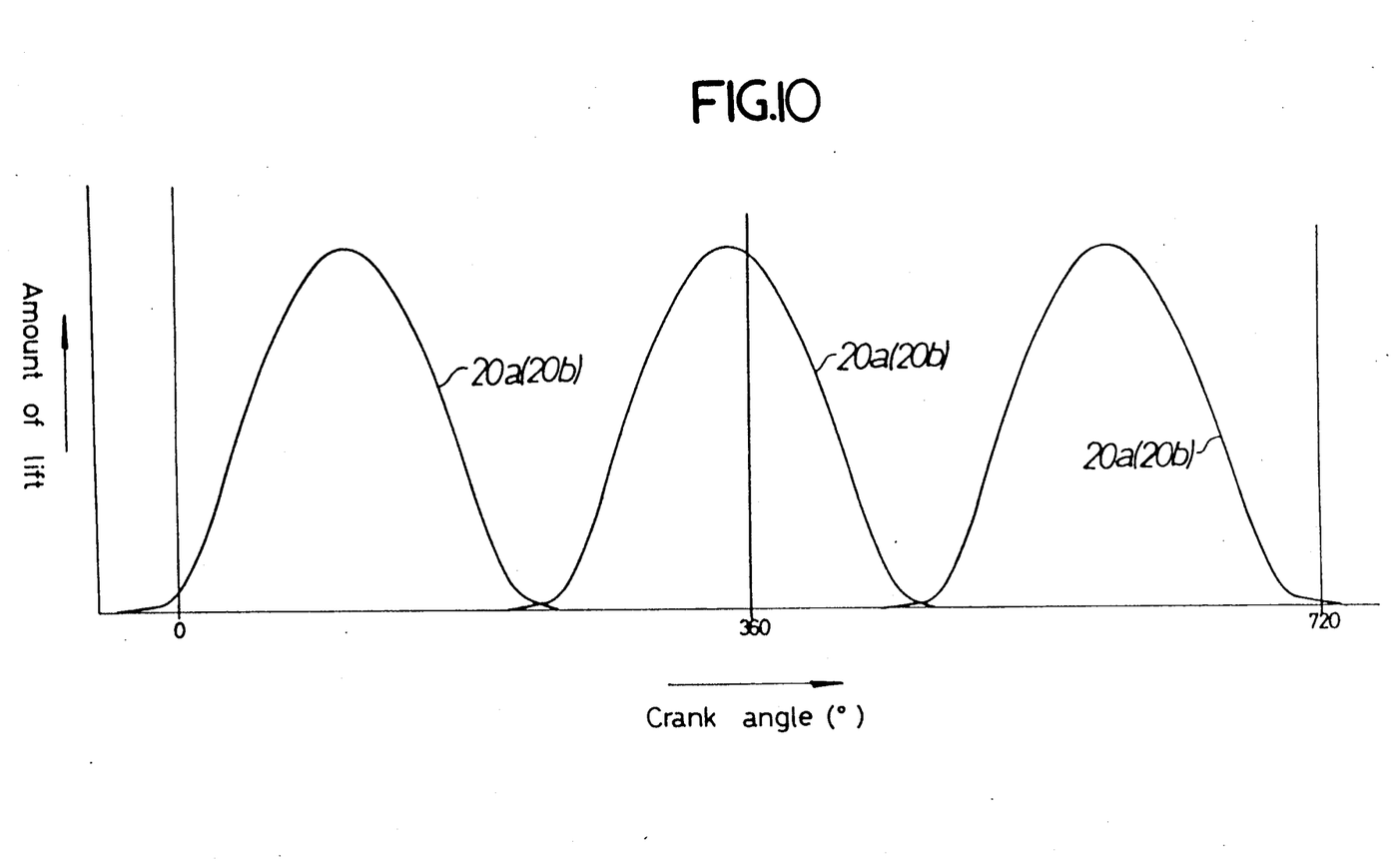
FIG. 10 is a chart of opening and closing timings of intake valves on each bank.

The suction strokes of the cylinders 2$a$ ..., 2$b$ ... on each bank Ba, Bb are not continuous with each other as is clearly shown as timing charts of the intake valves in FIG. 10 but are performed at equal intervals in the crank angle, so that the opening and closing actions of the intake valves 20$a$, 20$b$ of the respective cylinders are not accompanied by an interference of intake air in the intake system, thus permitting pressure waves to be generated in a well-regulated manner.

When the number of engine revolution reaches the predetermined level N1 in the low speed operational range A, the resonance chambers 14$a$, 14$b$ and the resonance ducts 12$a$, 12$b$ resonate with the afore-mentioned pressure waves and the waves are amplified to the maximum, and positive parts of the pressure waves amplified are introduced into the cylinders 1$a$ and 1$b$ immediately before the closure of the intake valves 20$a$. This resonating effect contributes to enhancing the charging efficiency for each of the cylinders 1$a$, 1$b$ and as is shown by curve $a$ in FIG. 11 the output performance in the low speed range is enhanced.

When the operation of the engine enters the intermediate speed range B and the number of revolution reaches the value N2, the actuator 24 operates and opens all the opening and closing valves 17$a$ ..., 17$b$ .... Then, the resonance chambers 14$a$, 14$b$ and the resonance ducts 12$a$, 12$b$ are placed in communication with the common intake chamber 15 via the communication ports 16$a$ ..., 16$b$ ..., as a result of which the intake air which has passed the inlet duct 10 flows through the resonance ducts 12$a$, 12$b$ and once enters a surge chamber of a large volume which is formed of both the resonance chambers 14$a$, 14$b$ and the intake chamber 15. The intake air is thereafter distributed into the six intake ducts 9$a$ ..., 9$b$ ... and sucked into all the cylinders 1$a$ ..., 1$b$ .... In this state, therefore, the resonance chambers 14$a$, 14$b$ and the resonance ducts 12$a$, 12$b$ lose their resonating function so that the charging efficiency is prevented from lowering in the intermediate speed operational range B, which efficiency would otherwise be deteriorated by such a resonating phenomenon. On the other hand, since the respective intake ducts 9$a$, 9$b$ have been designed so as to provide the inertia effect, the charging efficiency for each cylinder 1$a$, 1$b$ can be improved with the aid of the inertia effect and the output performance in the intermediate speed range can be enhanced as shown by curve b in FIG. 11, which reaches the maximum (torque peak) at the number of revolution N3.

When the engine enters the high speed operational range C, the oil supply passage 88$i$ is connected to the oil gallery 98 through the operation of the changeover valve 99 in the intake-side valve operating system 47$i$, whereby the high hydraulic pressure in the oil gallery 98 is introduced into the hydraulic pressure chamber 86 and with this pressure the first changeover pin 81 is fitted into the guide hole 89 and the second changeover pin 82 is fitted into the second guide bore 90, thus connecting the rocker arms 53$i$, 55$i$ and 54$i$ integrally.

Consequently, if the camshaft 48$i$ were driven to rotate in this state, the high speed cam 51$i$ having a large amount of lift acts on and causes the free rocker arm 55$i$ to be swung together with the drive rocker arms 53$i$, 54$i$, thereby opening and closing the intake valves 20$a$, 20$a$ in cooperation with the return springs 43$i$, 43$i$.

The exhaust-side valve operating system 47$e$ operates in the similar manner to open and close the exhaust valves 21$a$, 21$a$.

As a result, the amount of lift during opening and the angle of overlapping of the intake and exhaust valves 20$a$ and 21$a$ of each cylinder 2$a$ increase and the timing of closure of the intake valves 20$a$ is delayed, so that the intake resistance may be reduced, the scavenging property in each cylinder 2$a$ may be improved and the inertia of residual intake air may be utilized. Thereby, the output performance may be enhanced in the high speed range as indicated by curve c in FIG. 11, providing a torque peak at the number of engine revolution, N5.

Thus, as is clear in FIG. 11, the output characteristic curve over the low to high speed operational ranges A to C of the engine is obtained as a curve d which connects the crest portions of the individual curves a, b and c and this means that the engine can exhibit a high output characteristic at all times over all the operational ranges.

Although the invention has been described specifically in one embodiment thereof, it is understood that modification and variation of the invention is possible without departing from the spirit and the scope of the invention as hereinafter claimed.

It may be arranged, for example, that the timing of opening and closing of the valves 17$a$, 17$b$ coincides with the timing of changeover operation of the changeover valve 99.

What is claimed is:

1. An intake system of a multi-cylinder internal combustion engine having first and second groups of cylinders, each group of cylinders having such an order of ignition that any one of the cylinders is not ignited immediately before or after ignition of the other cylinders of the same group, comprising:

means for guiding intake air to respective cylinders via intake valves, including, from an upstream side, a common inlet passage, first and second resonance passages branched from the common inlet passage, first and second resonance chambers connected to said first and second resonance passages, respectively, and an intake chamber capable of communicating with the first and second resonance chambers through valve means, said first and second resonance chambers being connected to said first and second groups of cylinders through respective intake passages; and means for operating said intake valves and adjusting at least one of an amount of opening of each intake valve and a timing of opening and closing thereof;

wherein said valve means and said means for operating said intake valves are operated at least in response to a number of revolutions of the engine and in a low speed operational region of the engine the valve means is closed to place the first and second resonance chambers out of communication with said intake chamber and said means for operating the intake valves adjusts the operation of the intake valves to a mode suitable for the low speed region whereas in an operational region higher in speed than said low speed operational region there is provided at least one of two states in which the valve means is opened to communicate said intake chamber with the first and second resonance chambers and in which the means for operating the intake valves adjusts the operation of the intake valves to a mode for the higher speed operational region.

2. A system according to claim 1, wherein said engine is of V-type with the first group of cylinders on one side of the V and the second group of cylinders on the other side.

3. A system according to claim 2, wherein said means for guiding intake air to respective cylinders id disposed in a space defined between opposed groups of cylinders of the V-type engine.

4. A system according to claim 1, wherein when said valve means is opened, said first and second resonance chambers and said intake chamber cooperatively serve as a surge chamber of a large volume for the first and second groups of cylinders.

5. A system according to claim 1, wherein said valve means is closed when the number of revolution of the engine is less than a first predetermined value whereas it is opened when said number of revolution exceeds said first predetermined value, and wherein said means for operating the intake valves selects an earlier one of a plurality of closure timings of said intake valves when the number of revolutions of the engine is less than a second predetermined value which is higher than said first predetermined value, and selects a later one of the plurality of closure timings of the intake valves when the number of engine revolutions exceeds said second predetermined value.

6. An intake system of a multi-cylinder internal combustion engine having a plurality of cylinders in which the intake strokes do not substantially overlap each other during operation of the engine, comprising:

means for guiding intake air to respective cylinders via intake valves, including, from an upstream side, a resonance passage, a resonance chamber connected to the resonance passage, and an intake chamber capable of communicating with the resonance chamber through valve means, said resonance chamber being connected to said plurality of cylinders through respective intake passages; and means for operating said intake valves and adjusting at least one of an amount of opening of each intake valve and a timing of opening and closing thereof;

wherein said valve means and said means for operating said intake valves are operated at least in response to a number of revolutions of the engine and in a low speed operational region the valve means is closed to place said intake chamber out of communication with the cylinders and said means for operating the intake valves adjusts the operation of the intake valves to a mode suitable for the low speed region whereas in an operational region higher in speed than said low speed operational region there is provided at least one of two states in which the valve means is opened and the intake chamber is communicated with the resonance chamber as well as with the cylinders and in which said means for operating the intake valves adjusts the operation of the intake valves to a mode suitable for the higher speed operational region.

7. A system according to claim 6, wherein when said valve means is opened, said resonance chamber and said intake chamber cooperatively serve as a surge chamber of a large volume for the cylinders.

8. A system according to claim 6, wherein said valve means is closed when the number of revolutions of the engine is less than a first predetermined value whereas it is opened when said number of revolutions exceeds said first predetermined value, and wherein said means for operating the intake values selects an earlier one of a plurality of closure timings of said intake valves when the number of revolutions of the engine is less than a second predetermined value which is higher than said first predetermined value, and selects a later one of the plurality of closure timings of the intake valves when the number of engine revolutions exceeds said second predetermined value.

* * * * *